United States Patent
Haeusler et al.

(10) Patent No.: US 7,695,054 B2
(45) Date of Patent: Apr. 13, 2010

(54) SUSPENSION DEVICE WITH WATT'S LINKAGE

(75) Inventors: Felix Haeusler, Osnabrueck (DE); Jens Eismann, Melle (DE); Timo Kuepker, Twistringen (DE); Holger Lohmueller, Vehrte (DE); Marc von Lienen, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 527 days.

(21) Appl. No.: 11/531,383

(22) Filed: Sep. 13, 2006

(65) Prior Publication Data

US 2007/0056787 A1    Mar. 15, 2007

(30) Foreign Application Priority Data

Sep. 14, 2005   (DE)  ................ 10 2005 043 998

(51) Int. Cl.
    *B62D 33/10*    (2006.01)
(52) U.S. Cl. ................ 296/190.07; 180/89.13
(58) Field of Classification Search ............ 296/190.01, 296/190.04, 190.07; 180/89.13; 280/124.1, 280/124.106, 124.107, 124.14; 74/103
See application file for complete search history.

(56) References Cited

U.S. PATENT DOCUMENTS

| | | | | |
|---|---|---|---|---|
| 2,483,668 A * | 10/1949 | Reason et al. ................ | 73/105 |
| 3,501,120 A * | 3/1970 | Daniel, Jr. ................ | 248/277.1 |
| 3,600,925 A * | 8/1971 | Field et al. ................ | 72/207 |
| 3,891,232 A * | 6/1975 | Flemming ............... | 280/124.15 |
| 3,948,341 A * | 4/1976 | Foster ................... | 180/89.15 |
| 4,087,191 A * | 5/1978 | Brady et al. ............. | 404/69 |
| 4,438,970 A * | 3/1984 | Boucher ................ | 296/190.07 |
| 4,452,329 A * | 6/1984 | Stone et al. ............. | 180/89.15 |
| 4,545,266 A * | 10/1985 | Brems ................... | 74/103 |
| 5,253,853 A * | 10/1993 | Conaway et al. .......... | 267/256 |
| 5,368,118 A * | 11/1994 | Hoefle ................. | 180/89.12 |
| 5,553,911 A * | 9/1996 | Bodin et al. ............ | 296/190.07 |
| 5,590,733 A * | 1/1997 | Ljungholm et al. ...... | 180/89.14 |
| 6,109,381 A * | 8/2000 | Stuyvenberg et al. .... | 180/89.12 |
| 6,206,121 B1 * | 3/2001 | Michel .................. | 180/89.13 |
| 6,626,454 B1 * | 9/2003 | Power et al. ............ | 280/683 |
| 6,702,367 B2 * | 3/2004 | Leitner et al. .......... | 296/190.07 |

(Continued)

FOREIGN PATENT DOCUMENTS

DE            3428159 A * 2/1986

(Continued)

*Primary Examiner*—Hilary Gutman
(74) *Attorney, Agent, or Firm*—McGlew and Tuttle, P.C.

(57) ABSTRACT

A suspension device is provided for the spring-loaded suspension of a weight body (3) relative to a substructure (1) such as a vehicle body, a cab (3) of a truck relative to the vehicle chassis (1). The suspension device has a spring/absorber device (2) arranged between the weight body (3) and the substructure (1) for absorbing shocks and vibrations. The suspension device includes at least one Watt's linkage arrangement (6) connecting the weight body and the substructure for reducing the degrees of freedom of motion of the weight body (3). The suspension device requires little maintenance and has little clearance and is suitable for setting the degrees of freedom of motion of the weight body as well as for absorbing and preventing the undesired motions of the weight body along other directions in space. The suspension device thus makes possible an inexpensive and reliably operating suspension especially of truck cabs.

16 Claims, 4 Drawing Sheets

U.S. PATENT DOCUMENTS

| | | | |
|---|---|---|---|
| 6,758,294 B2 * | 7/2004 | Peddycord et al. | 180/89.12 |
| 6,805,215 B2 * | 10/2004 | Puterbaugh | 180/89.13 |
| 7,077,227 B2 * | 7/2006 | Oliver et al. | 180/89.12 |
| 7,237,830 B1 * | 7/2007 | Smith | 296/190.07 |
| 7,300,100 B2 * | 11/2007 | McLean et al. | 296/190.07 |
| 2004/0099451 A1 * | 5/2004 | Nagorcka et al. | 180/9.5 |
| 2004/0129468 A1 * | 7/2004 | Oliver et al. | 180/89.12 |
| 2005/0274557 A1 * | 12/2005 | Barta et al. | 180/89.15 |
| 2006/0261639 A1 * | 11/2006 | Biasiotto et al. | 296/190.07 |
| 2007/0267894 A1 * | 11/2007 | Van Den Brink et al. | 296/190.07 |

FOREIGN PATENT DOCUMENTS

| | | | |
|---|---|---|---|
| DE | 3826010 A1 * | 2/1989 | |
| GB | 2143785 A * | 2/1985 | |
| JP | 02099416 A * | 4/1990 | |

* cited by examiner

SUSPENSION DEVICE WITH WATT'S LINKAGE

CROSS REFERENCE TO RELATED APPLICATIONS

This application claims the benefit of priority under 35 U.S.C. §119 of German Patent Application 10 2005 043 998.5 filed Sep. 14, 2005, the entire contents of which are incorporated herein by reference.

FIELD OF THE INVENTION

The present invention pertains to a suspension device for the spring-loaded or shock-absorbing suspension of a weight body.

BACKGROUND OF THE INVENTION

Suspension device of the type mentioned in the introduction are used, as an example, but by no means exclusively, in trucks and similar heavy trucks in order to uncouple the cab from the chassis of the vehicle with respect to vibrations and motions. Since the spring rates of the chassis springs are inevitably high in heavy trucks because of the high vehicle loads, unevennesses of the road surface or even vibrations from axles and the powertrain are still transmitted to the chassis to a considerable extent via the axle spring system.

Cab suspensions in which the cab is supported at the vehicle chassis with the use of a separate suspension system have been developed to minimize the transmission of such shocks and vibrations to the cab and consequently to the driver's workplace in terms of ergonomics and occupational safety for the driver. Due to the fact that the weight of the cab is much lower than the weight of the vehicle, such suspension systems for the cab can be designed with considerably lower spring rates and softer shock absorbers than the axle suspension, and unevennesses and vibrations originating from the powertrain or axles of the vehicle can therefore be isolated or kept away from the driver's workplace considerably better thanks to such cab suspension systems.

However, such suspension device for cabs are of a relatively complicated design, especially if higher requirements are imposed on the absorption of lateral forces or kinematics, for example, the suppression of pitch and roll. Thus, similarly to the case of axle suspensions of motor vehicles, it may often even be necessary to provide additional roll stabilizers, besides the spring and absorber elements proper.

To limit, for example, the undesirable lateral roll of the cab relative to the vehicle chassis, for example, during slant travel or travel in a curve, but, for example, also in case of unevennesses on one side of the road surface, roll stabilizers in the form of torsion bars, by which the shock absorber strokes of the suspension elements of the cab, which elements are the left and right suspension elements relative to the direction of travel, can be coupled with one another to a certain extent, are frequently necessary in suspension device according to the state of the art. However, such torsion bars are, first, highly stressed components, which therefore tend to be expensive.

In order to additionally also prevent or absorb motions or vibrations of the cab in the lateral transverse direction, it is frequently also necessary to provide additional spring/absorber units in the transverse direction of the vehicle, or roller guides for guiding the cab in the vertical direction of motion. Roller guides for limiting the transverse motion are, however, complicated and therefore expensive and, moreover, they have a high maintenance requirement. In addition, such roller guides are often susceptible in terms of fatigue strength and, moreover, they often entail rather substantial noise generation, which in turn has a disadvantageous effect on the ergonomics of the driver's workplace, which should actually be improved.

By contrast, motion absorbers arranged in the transverse direction of the vehicle are inevitably limited to being able to absorb dynamic lateral forces only. By contrast, lateral absorbers are ineffective due to their design in case of quasi-static loads as they develop, for example, during prolonged travel in curves or slant travel.

The devices known from the state of the art for suppressing rolling motions and for absorbing motions of the cab in directions other than in the principal shock direction are therefore of a complicated design, especially because of the high loads acting and, moreover, as was already explained, they have limited suitability.

SUMMARY OF THE INVENTION

Against this background, the object of the present invention is to provide a suspension device for the spring-loaded suspension of a weight body, especially for suspending a vehicle cab, with which a drawbacks of the state of the art can be overcome. In particular, the suspension device shall make it possible to set the desired degree of freedom of motion of the weight body in a robust and reliable manner and to effectively absorb or prevent at the same time undesired motions along other degrees of freedom of motion or in other directions in space.

The suspension device according to the present invention is used, in the known manner, for the spring-loaded suspension of a weight body relative to a substructure, i.e., for example for the suspension of the cab of a truck in relation to the chassis of the vehicle.

The suspension device comprises, in the manner known per se, a spring/absorber device arranged between the weight body and the substructure for absorbing shocks and vibrations.

However, the suspension device is characterized according to the present invention in that it comprises at least one Watt's linkage arrangement for reducing the degree of freedom of motion of the weight body in relation to the substructure. The Watt's linkage arrangement connects the weight body and the substructure such that relative motions between the weight body and the substructure are possible to a limited extent only.

In other words, the Watt's linkage arrangement is consequently used to still enable the weight body to move along the desired degrees of freedom of motion or along the intended direction in space, relative to the substructure, whereas the motion of the weight body along at least one other direction in space is absorbed or prevented. The Watt's linkage arrangement is consequently used to reduce the number of degrees of freedom of motion of the weight body relative to the substructure.

The connection according to the present invention between the weight body and the substructure by means of a Watt's linkage arrangement is advantageous especially insofar as a practically clearance-free straight-line motion of the weight body relative to the substructure is thus achieved with an especially simple design and in an especially robust manner. At the same time, undesired lateral motions of the weight body along at least one direction of motion extending at right angles to the direction of straight-line motion or principal direction of shock can thus be prevented from occurring.

The present invention is embodied first independently from how the Watt's linkage arrangement is specifically designed and from how it is arranged between the substructure and the weight body.

According to a preferred embodiment of the present invention, the suspension device is characterized, however, in that the Watt's linkage arrangement comprises at least two Watt's linkages. The directions of straight-line motion of the at least two Watt's linkages now agree, the Watt's linkages are arranged at spaced locations from one another along the common direction of straight-line motion, and the planes of motion of the Watt's linkages extend in parallel to one another.

This embodiment, comprising at least two Watt's linkages, which are arranged at spaced locations from one another, has especially the additional advantage that in addition to the straight-line motion of the weight body, which can already be accomplished with a single Watt's linkage, so-called rolling or pitching motions can also be effectively suppressed. This is linked with the fact that Watt's linkages arranged at spaced locations between the substructure and the weight body can transmit not only lateral forces (like an individual Watt's linkage), but also torques, for example, rolling torques, because of the distance between the Watt's linkages, which distance acts as a lever arm.

Consequently, it is, furthermore, also possible, in other words, to effectively suppress undesired rotary motions of the weight body about at least one of its principal axes, in addition to the straight-line motion of the weight body, thanks to such a design, which is also suitable for transmitting torques.

How the at least two Watt's linkages are designed and arranged is, first, irrelevant as long as the loads to be expected can be absorbed and as long as a lever arm suitable for transmitting the occurring torques is formed because of the distance between the Watt's linkages. According to another, preferred embodiment of the present invention, the joints of the at least two Watt's linkages are, however, essentially in a common plane of motion. In other words, this means that the joints of the at least two Watt's linkages are arranged such that the positions of all joints define a plane of motion or all joints of the at least two Watt's linkages are located essentially in one and the same plane.

This embodiment is advantageous insofar as warping is hereby prevented from occurring and secondary torques, which could develop if there possibly is a distance between planes of motion of different Watt's linkages, are thus prevented from being generated.

According to another embodiment of the present invention, the at least two Watt's linkages are arranged offset sideways in relation to their common direction of straight-line motion. This embodiment additionally permits the at least two Watt's linkages of the Watt's linkage arrangement to be arranged in an especially space-saving and compact manner and, moreover, it increases the design-related freedom of shaping in terms of the shaping and arrangement of the Watt's linkages.

According to another, preferred embodiment, the Watt's linkage arrangement comprises two Watt's linkages. The fastening point or mounting point of the central Watt's linkage arm, which belongs to the first Watt's linkage, is connected to the substructure, and the fastening point or mounting point of the Watt's linkage arm that belongs to the second Watt's linkage is connected to the weight body.

The Watt's linkage or the arms of which the Watt's linkages are composed can thus be arranged in an even more compact manner and even nested in one another to a certain extent. This leads to an especially compact design of the Watt's linkage arrangement with even better utilization of the space available for installation.

Provisions are made in another preferred embodiment of the present invention for the Watt's linkage arrangement to comprise two Watt's linkages, wherein the distance between the fulcrum points of the two central Watt's linkage arms is, however, greater than the respective distances between the outer articulation points of the two Watt's linkages, which said articulation points are associated with the lateral thrust struts of the Watt's linkages. In other words, this means that the imaginary connection lines between the six articulation points of the two Watt's linkages no longer form a parallelogram, as before, but come close to a trapezoidal shape, because the distances between the outer articulation points of the two Watt's linkages are smaller in this embodiment than the distances of the two central articulation points.

However, this embodiment thus leads to an increase in the length of the lever arm formed by the distance between the fulcrum points of the two central Watt's linkage arms. This longer lever arm can thus be used better to absorb torques, for example, rolling torques of a cab.

This brings with it the decisive advantage that at a given torque or rolling torque, only reduced forces will have to be transmitted via the Watt's linkage arrangement, these forces being inversely proportional to the increased length of this lever arm. Weaker and consequently lighter dimensioning of the Watt's linkage will thus become possible, but the torques, for example, from the roll absorption of a cab, which may be considerable at the same time, can be transmitted to the same extent via the Watt's linkage arrangement and can be introduced into the substructure, for example, into the chassis of a truck. Furthermore, the remaining rolling motions that are due to inevitable elasticities, for example, in the area of the Watt's linkages, in the area of the articulations of the Watt's linkages to the weight body or to the chassis, or also because of flexibilities of elastomer bearings that may be used, are thus also reduced because of the weaker forces to be transmitted.

Provisions are, furthermore, made according to an especially preferred embodiment of the present invention for the outer articulation points associated with the lateral thrust struts of the two Watt's linkages to be located in pairs each on a pivot axis that is common to both Watt's linkages. In other words, this means that the distance between the outer articulation points between the two Watt's linkages is not reduced by a certain amount only in this embodiment, as in the above-described embodiment, but this distance becomes zero here. As a result, the outer articulation points of the lateral thrust struts of the two Watt's linkages share two joint axes only, instead of requiring, as before, four joint axes.

The number of components and consequently costs are thus reduced. Furthermore, the Watt's linkage arrangement can thus be manufactured in an especially compact and space-saving manner, and, due to the design, only two frame-side connection points are needed instead of the four frame-side connection points needed before. Since the forces, which are generated by the two Watt's linkage arms and act on the frame-side connection points, partially mutually cancel each other in this arrangement because of vectorial addition, the frame-side connection parts can be designed as lighter and consequently less expensive components. Furthermore, reduced stiffnesses can be used for the elastomer bearings when elastomer bearings are used, which promises better sound insulation.

The latter happens especially when the lateral thrust struts of the two Watt's linkages, which lateral thrust struts converge with their outer articulation points, are mounted non-elastically, on a common pivot axis, for the purpose of the vectorial addition of forces, whereas only the common pivot axis, taken in itself, is connected elastically at the corresponding frame-side connection points.

Provisions are, furthermore, made according to another preferred embodiment of the present invention for the lateral thrust struts of the two Watt's linkages, which are articulated to a common pivot axis in the area of their outer articulation points, to be made in one piece each in the form of a combination strut. This embodiment, in which the lateral thrust struts articulated together form a component each resembling a steering triangle, brings with it decisive additional design simplifications.

Namely, the number of necessary components is reduced even further in this manner. In particular, only two drag bearings are needed to connect the outer articulation points of the lateral thrust struts, instead of the four needed before. Furthermore, both Watt's linkages of the Watt's linkage arrangement thus combined can thus be arranged essentially in one and the same plane without problems, which leads to a further, decisive reduction of the space needed for installation. The forces introduced into the corresponding connecting parts are also weaker in this embodiment because of the partial vectorial cancellation of forces, again with the consequence that the advantages just mentioned will be achieved in terms of weight and costs as well as concerning the use of elastomer bearings for the possible sound insulation.

The warping and deformation of the one-piece combination lateral thrust struts thus formed, which is possible in this embodiment as a function of the spring stroke, can, moreover, be used, by way of design, to obtain structurally variable spring rates that depend on the spring stroke for the elastic suspension between the weight body and the substructure.

Provisions are made according to other embodiments of the present invention for at least one of the mounting points, but preferably for a plurality of or all mounting points of the Watt's linkage arrangement to be designed as elastomer bearings and for the pivot axes of lateral thrust strut pairs that are articulated together or are made in one piece to be connected elastically to the weight body and the substructure.

Designing one or more of the mounting points or even all mounting points of the Watt's linkage arrangement as elastomer bearings offers especially the advantage that the suspension device can thus be designed as an especially robust and resistant suspension device, but the amount of maintenance needed decreases at the same time to a minimum. In addition, an additional vibration absorption in the micro range is thus achieved as well, which reduces both the loads on the bearings and the load on the material as well as leads to a further improvement in the comfort that can be achieved with the suspension device, especially in case of use in the field of vehicles.

The elastic connection of the pivot axes of lateral thrust strut pairs that are articulated together or are made in one piece brings with it the additional advantage, already described above, that a partial vectorial cancellation of the tensile and compressive forces prevailing in the lateral thrust struts can thus take place, via the common articulation of the lateral thrust strut pairs and via the lateral thrust strut pairs connected to one another in one piece, before the remaining forces, which are much weaker in value, are to be elastically introduced into the substructure or the weight body.

Finally, structural warping and self-locking of Watt's linkage arrangements can be prevented from occurring under certain spring deflection conditions due to the use of elastomer bearings, and manufacturing tolerances and tilting occurring during operation can be better absorbed.

Provisions are made according to another embodiment of the present invention for the suspension device to comprise not only one but a plurality of Watt's linkage arrangements. It is thus possible to achieve a further improvement in the precision of guiding, higher load-bearing capacity as well as an increase in safety, especially in case of the application of the present invention in vehicle construction, independently from the specific design embodiment and arrangement of the Watt's linkages.

According to another, especially preferred embodiment, the planes of motion defined by the joints of one of the Watt's linkage arrangements are arranged at right angles to the planes of motion defined by the joints of another Watt's linkage arrangement. In other words, this means that at least two Watt's linkage arrangements are used, whose respective Watt's linkages are arranged in planes that extend at right angles to one another. The degree of freedom of motion of the weight body can thus be reduced especially effectively to motions along only one direction in space, while motions along the other two directions in space are ruled out. Undesired rotations of the weight body about at least two axes of a Cartesian system of coordinates, i.e., for example, both rolling motions and pitching motions of a cab, can also be reliably prevented in this manner from occurring.

According to another embodiment of the present invention, the suspension device comprises, furthermore, at least one arm, for example, a longitudinal arm or a Panhard rod. The arm is arranged at right angles to the planes defined by the joints of the Watt's linkages of a Watt's linkage arrangement.

Even better absorption of the forces that act at right angles to the planes of motion defined by the Watt's linkages of a Watt's linkage arrangement or at right angles to a principal direction of motion of the weight body is achieved in this manner. Furthermore, it is thus possible to reduce the bending loads due to forces acting at right angles to the plane of motion of the Watt's linkage, which are potentially harmful for the joints and arms of the Watt's linkages.

In case of application in the area of motor vehicles, an arm arranged at right angles to the planes of motion of a Watt's linkage arrangement optionally also means improved absorption of the considerable longitudinal forces occurring in case of a crash, if the arm or the arms is/are arranged in the direction of travel. However, it is also possible to support in this manner the transmission of the lateral forces acting in parallel to the axes of rotation of the mount of the additional arm between the weight body and the substructure based on a suitable design of the arm and the suitable mounting thereof, for example, as a steering triangle with elastomer bearings.

Another, especially preferred embodiment of the present invention provides for essentially the entire suspension device to be designed as a modular system. In other words, this means that the essential components of the suspension device, especially the mounts and bars of the Watt's linkages, are designed as standard components that can be universally combined with one another. By selecting the particular, fitting standard components, it is thus possible to embody a suspension device with different dimensions in an especially simple manner and at an especially low cost, and the suspension device can be used without appreciable design modifications, for example, for different vehicle sizes or vehicle categories, or even to compensate connection tolerances that may possibly occur.

Furthermore, all embodiments of the present invention can be embodied with the same advantages according to the present invention by exchanging the substructure-side or chassis-side connection points of the Watt's linkage arrangement with the weight body-side or cab-side connection points.

The present invention will be explained in greater detail below on the basis of drawings showing only exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
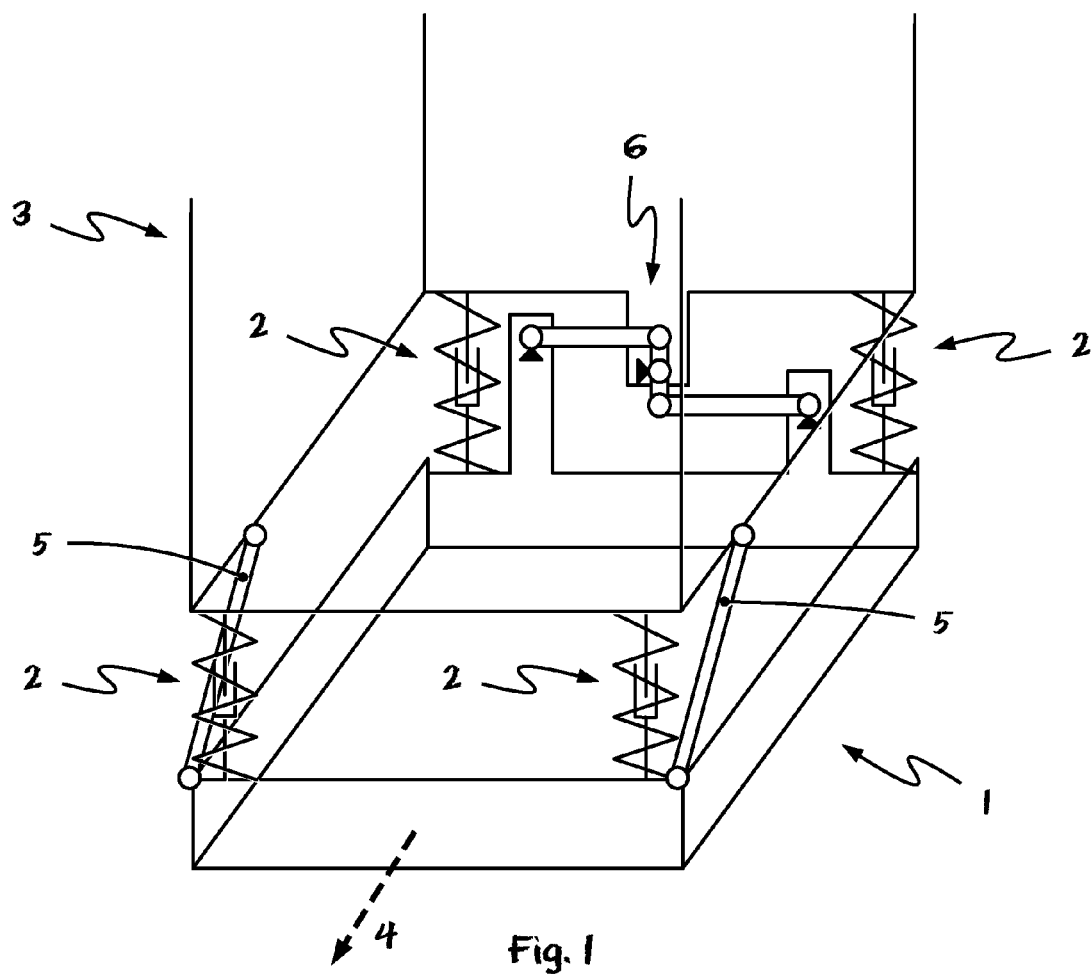
FIG. 1 is a schematic isometric view of an embodiment of a suspension device according to the present invention.

Referring to the drawings in particular, FIG. 1 shows a highly schematic, isometric view of an embodiment of a suspension device according to the present invention. A substructure 1 and a weight body 3 are indicated schematically. The weight body 3 is connected to the substructure 1 via a spring/absorber device 2. In the embodiment being shown, the substructure shall represent the front area of the chassis 1 of a truck, while the weight body indicated represents the cab 3 of the truck. The direction of travel 4 extends obliquely out of the plane of the drawing, as it is indicated by the arrow drawn in broken line.

It is recognized from FIG. 1 that the connection between the cab 3 and the chassis 1 comprises, besides four spring/absorber devices 2, two longitudinal arms 5 arranged in the front area of the cab as well as a Watt's linkage 6 arranged in the rear area of the cab. The longitudinal arms 5, which are indicated highly schematically only, and which extend essentially horizontally in reality, rather than obliquely upwardly as shown here for the sake of easier representation, are used primarily to absorb longitudinal forces between the cab 3 and the chassis 1. Especially the strong longitudinal forces developing in case of a possible crash can thus be reliably controlled and transmitted between the chassis 1 and the cab 3 thanks to the longitudinal arms 5. However, the longitudinal arms 5 may also be designed such that a certain roll stabilization is thus additionally made possible in the front area of the cab 3.

Figure 2:
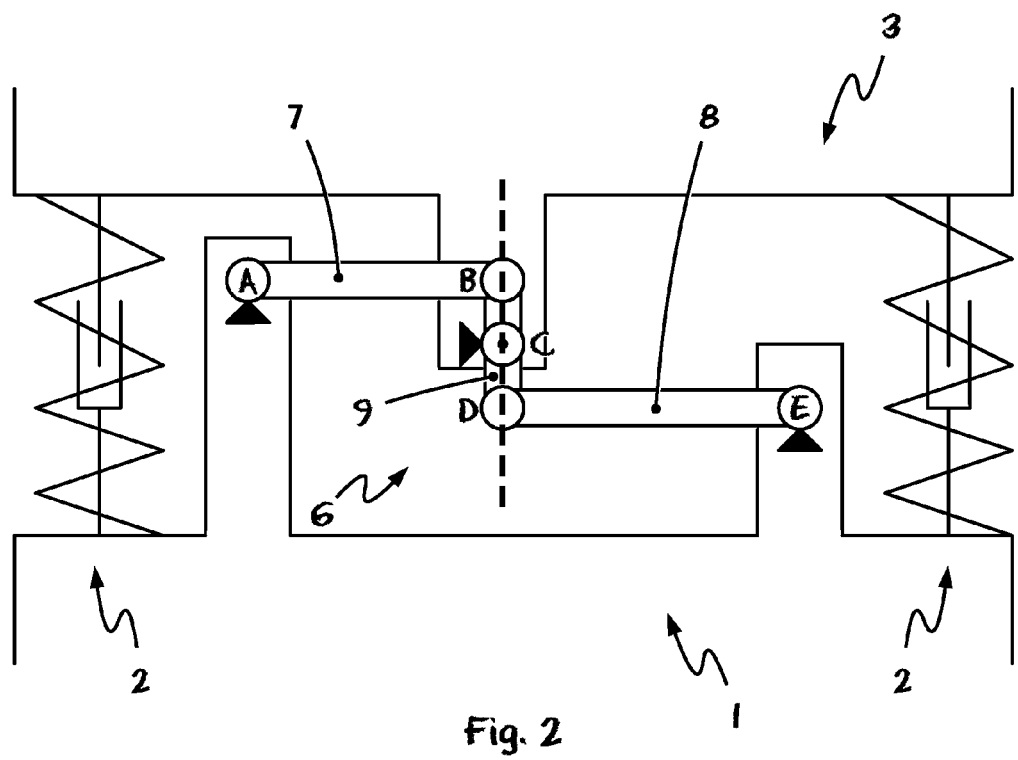
FIG. 2 is a side view of the Watt's linkage of the suspension device according to FIG. 1 in a representation corresponding to the embodiment of FIG. 1.

A Watt's linkage 6, which connects the cab 3 and the chassis 1, can be recognized in the rear area of the cab 3, and it is shown in FIG. 2 in an even more enlarged form in the rear view, relative to the cab 3. It is recognized in FIG. 2 that the Watt's linkage 6 comprises five joints, which are designated by the letters A, B, C, D and E. Of the joints A through E, A and E are rigidly connected to the frame, whereas C is rigidly connected to the cab. The joints A through E of the Watt's linkage are connected to one another by a device comprising two lateral thrust struts 7, 8 and a central Watt's linkage arm 9.

Based on the special kinematics of the Watt's linkage 6 according to FIG. 2, the lateral transverse motions of the cab 3 relative to the chassis 1 are absorbed via the joints A, C and E, while the Watt's linkage 6 allows, by contrast, relative motions of the cab 3 and chassis 1 along the vertical to take place completely unhindered. This is linked with the fact that the central fulcrum point C of the Watt's linkage arm 9 cannot leave its vertical path of motion indicated by the broken line because it is guided by the two lateral thrust struts 7 and 8, which must have the same length for this, and whose outer articulation points A and E must have a vertical length that corresponds to the length of the Watt's linkage arm 9. As a result, the cab 3 and the chassis 1 are always held in the position being shown, in which they are vertically centered one on top of another. A relative transverse motion of the cab 3 relative to the chassis 1 does not take place.

Static or dynamic lateral forces occurring are thus transmitted directly via the lateral thrust struts 7 and 8, via the Watt's linkage arm 9 as well as via the joints A through E between the cab 3 and the chassis 1, so that no additional lateral guiding or support of the cab 3 is necessary, at any rate in the area of the Watt's linkage 6, i.e., in the rear area of the cab 3 in this embodiment. The vertical motion between the cab 3 and the chassis 1 thus remains completely unhindered because of the free vertical mobility of the Watt's linkage arm 9, and, as is intended, it is absorbed or intercepted by the spring/absorber devices 2 only.

Figure 3:
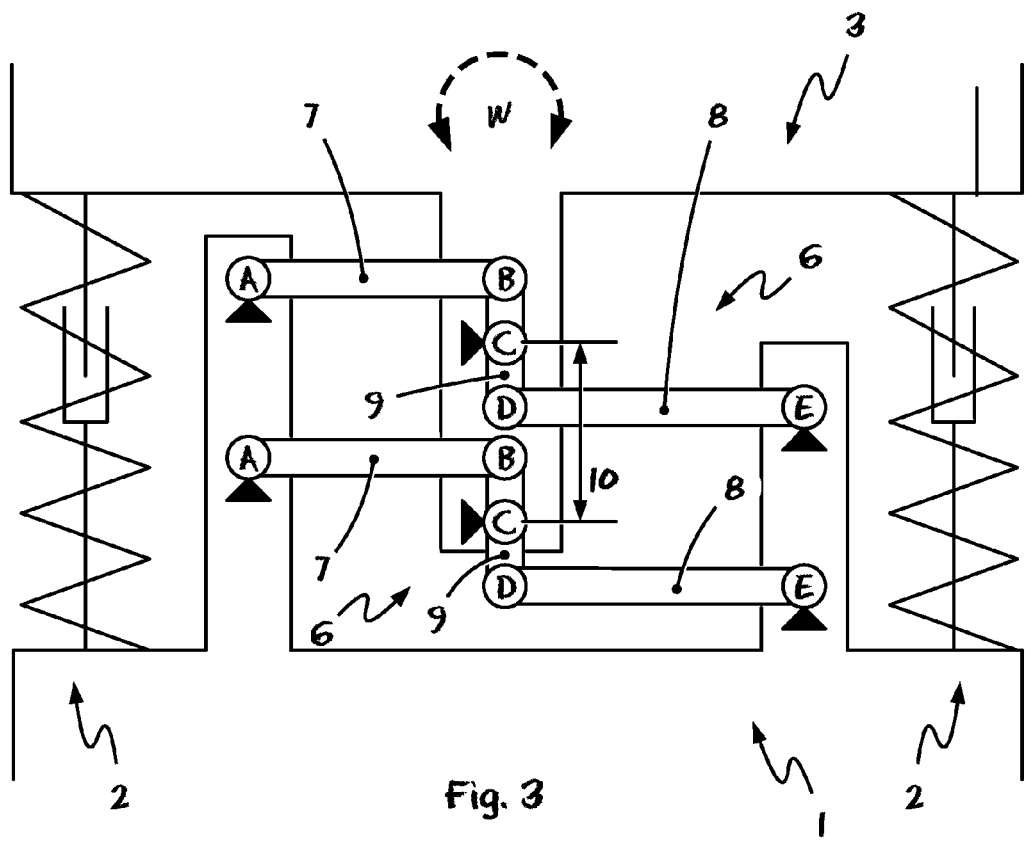
FIG. 3 is a side view of a Watt's linkage arrangement according to a second embodiment of the present invention, the view being similar to the view of FIG. 2.
Figure 4:
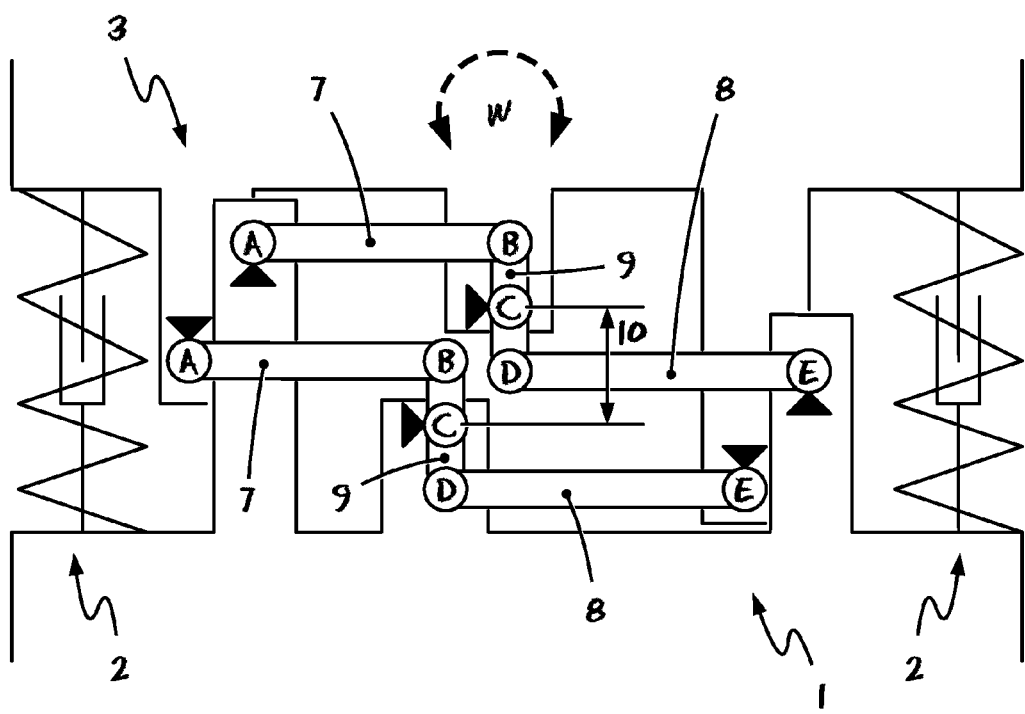
FIG. 4 is a side view of a Watt's linkage arrangement according to a third embodiment of the present invention, the view being similar to the view of FIGS. 2 and 3.

FIGS. 3 and 4 show respective Watt's linkage arrangements according to other embodiments of the present invention in a representation and view corresponding to FIG. 2. The Watt's linkage arrangements shown comprise here two separate, complete Watt's linkages 6 each, whose respective straight-line motion directions agree, and whose planes of motion, defined by the position of the respective arms 7, 8 and the respective joints A through E, extend in parallel to one another, or whose planes of motion approximately coincide with the drawing plane.

Such embodiments with two Watt's linkages 6 arranged at vertically spaced locations have especially the advantage that it is thus possible not only to achieve straight-line motion of the cab 3 relative to the chassis 1, but also to additionally achieve stabilization against rotary motions, namely, rolling motions W according to FIG. 3 and optionally also against pitching motions.

This is due to the fact that the Watt's linkages 6 arranged at mutual, vertically spaced locations 10 from one another between the chassis 1 and the cab 3 according to FIGS. 3 and 4 can transmit not only lateral forces, unlike an individual Watt's linkage. Because of the vertical distance 10 acting as a lever arm between the two Watt's linkages 6, it is thus rather also possible to transmit torques, which act about the longitudinal axis of the vehicle in the exemplary embodiments shown in FIGS. 3 and 4, and which are consequently rolling torques W.

In other words, this means that the cab 3 in the exemplary embodiments according to FIGS. 3 and 4 can perform only the (desired) vertical compensating motions relative to the chassis 1, but that lateral relative motions or rotations W about the longitudinal axis of the vehicle are prevented from occurring thanks to the Watt's linkage arrangement being shown.

The Watt's linkage arrangements according to FIGS. 3 and 4 differ from one another first in that the two Watt's linkages 6 in the embodiment according to FIG. 4 are arranged laterally offset. Furthermore, in the embodiment according to FIG. 4, the Watt's linkage arm 9 of the Watt's linkage that is the upper Watt's linkage in the drawing is connected, just as in the embodiment according to FIG. 3, by its fulcrum point C to the cab 3, whereas the Watt's linkage arm 9 of the lower Watt's linkage is connected to the chassis 1 here. These two differences from the embodiment according to FIG. 3 cause in the embodiment according to FIG. 4 that the Watt's linkages can be nested in one another and thus they can be arranged in an especially space-saving manner.

Figure 5:
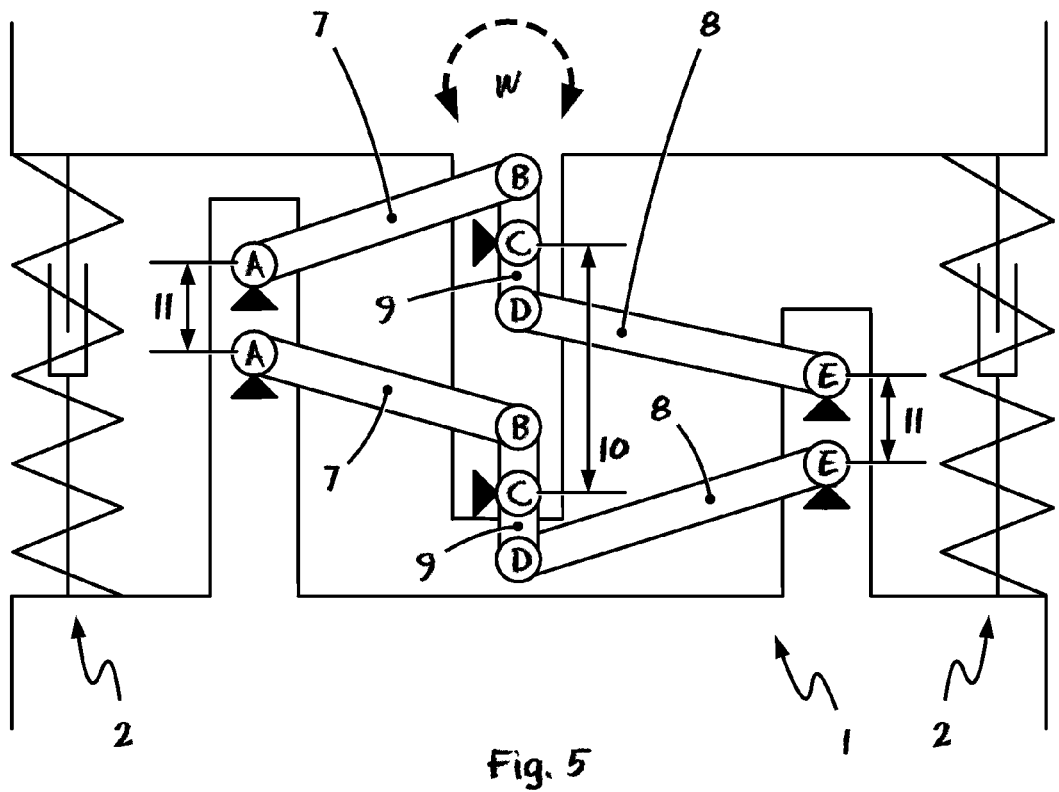
FIG. 5 is a side view of a Watt's linkage arrangement according to a fourth embodiment of the present invention, the view being similar to the view of FIGS. 2 through 4.
Figure 6:
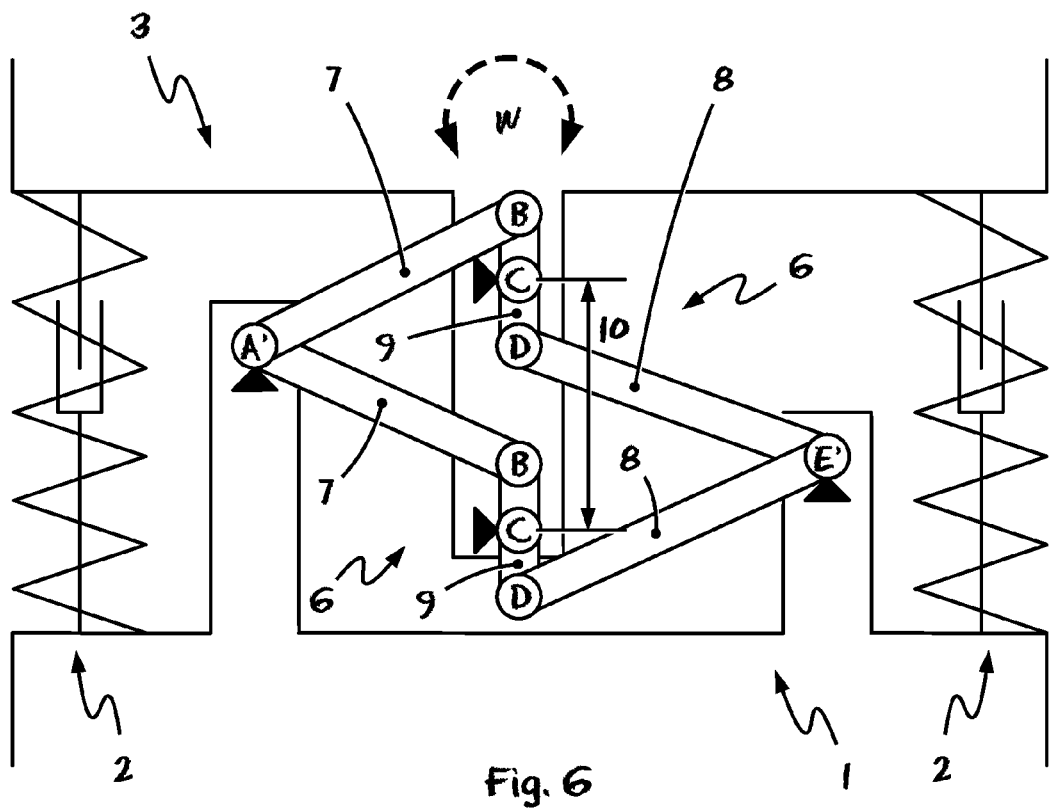
FIG. 6 is a side view of a Watt's linkage arrangement according to a fifth embodiment of the present invention, the view being similar to the view of FIGS. 2 through 3.

Other embodiments of suspension device, especially for cabs, are shown in FIGS. 5 and 6. The embodiments being shown here are based, in principle, on the embodiment according to FIG. 3. However, the embodiments according to FIGS. 5 and 6 differ from the embodiment according to FIG. 3 in that the distance 10 between the fulcrum points C of the two Watt's linkage arms 9 is greater here than the distances 11 of the outer articulation points A, E of the two Watt's linkages 6 that are associated with the lateral thrust struts 7, 8.

As the applicant has discovered, these special geometric relations in the embodiments according to FIGS. 5 and 6 do not compromise the function of the Watt's linkages in any way. This means, in particular, that the desired straight-line motion of the Watt's linkage arms or the straight-line motion of the central articulation points C of the Watt's linkage arms remains fully intact in these embodiments as well.

However, on the other hand, the decisive advantage arises that the length of the lever arm 10, which is formed by the distance 10 between the central articulation points C of the two Watt's linkage arms 9, which distance is increased here, is increased here in proportion to the increase in the distance 10 between these two articulation points C. However, this causes that rolling torques W introduced via the chassis 1 or the cab 3 will likewise lead to proportionally reduced forces of reaction only, which applies to both the forces acting within the Watt's linkages 6 and the forces introduced into the chassis 1 and the cab 3 via the articulation points A and E.

Thanks to the embodiments according to FIGS. 5 and 6, both the Watt's linkages 6 and the suspensions A, E thereof at the chassis 1 and the cab 3 can thus be dimensioned weaker and hence with reduced material consumption. Moreover, the rolling motions, which are still present despite straight-line motion, can also be further reduced or minimized in this manner. Such remaining residual rolling motions develop especially because of unavoidable elasticities, for example, in the area of the Watt's linkages 6, in the area of the articulations A, E of the Watt's linkages 6, or even because of elasticities in the case of an elastomer mount in one or more of the bearing points A through E of the Watt's linkages 6. Such residual rolling motions can likewise be reduced correspondingly because the forces to be transmitted are proportionally weaker in the embodiments according to FIGS. 5 and 6.

The Watt's linkage arrangement according to FIG. 6 differs from the embodiment according to FIG. 5 primarily in that the outer articulation points associated with the lateral thrust struts 7, 8 of the two Watt's linkages 6 are located in pairs on a respective pivot axis A' and E' that is common to the two Watt's linkages 6. In other words, this means that the distance between the outer articulation point pairs A and E between the two Watt's linkages 6 is not only reduced in this embodiment by a certain amount, to the distance 11 present there, contrary to the preceding embodiment according to FIG. 5, but this distance was set to zero in the embodiment according to FIG. 6. Thus, the outer articulation point pairs A and E of the lateral thrust struts 7 and 8 of the two Watt's linkages 6 share as whole only two joint axes at A' and at E', instead of requiring four joint axes (twice A, twice E), as in the exemplary embodiments according to FIGS. 3 through 5.

Thus, the number of components, here especially frame-side or chassis-side articulations as well as bearing axes, is thus reduced, and costs are thus reduced as well. Furthermore, the Watt's linkage arrangement can thus be designed as an especially compact unit and valuable installation space is saved.

Figure 7:
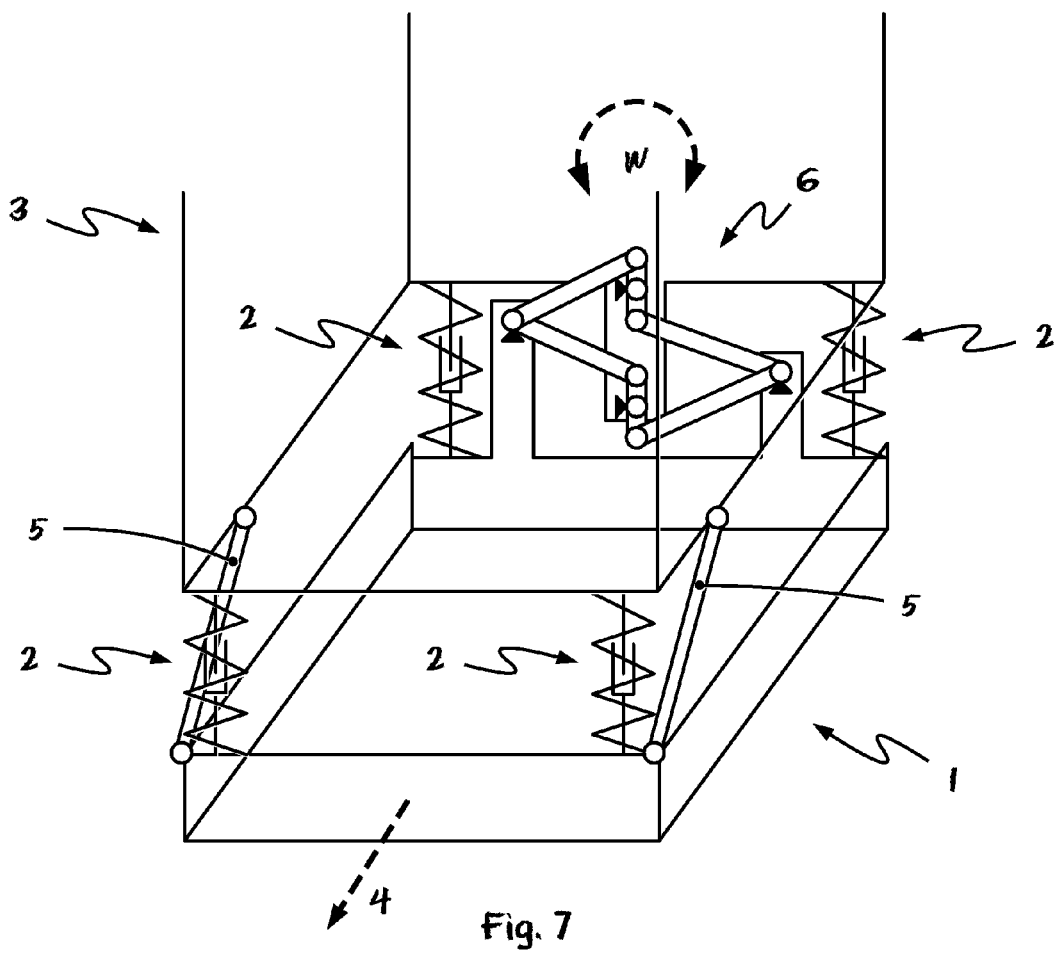
FIG. 7 is a schematic isometric view of a suspension arrangement of the embodiment according to FIG. 6.

FIG. 7 shows the Watt's linkage arrangement according to FIG. 6 once again schematically in the installed state in the rear area between a truck cab 3 and a chassis 1. It becomes clearly recognizable especially by viewing FIG. 7 and FIG. 1 as well as FIG. 3 and FIG. 4 together that a Watt's linkage arrangement according to FIG. 6 or 7 can, moreover, be designed and arranged at the motor vehicle in an especially space-saving manner.

Figure 8:
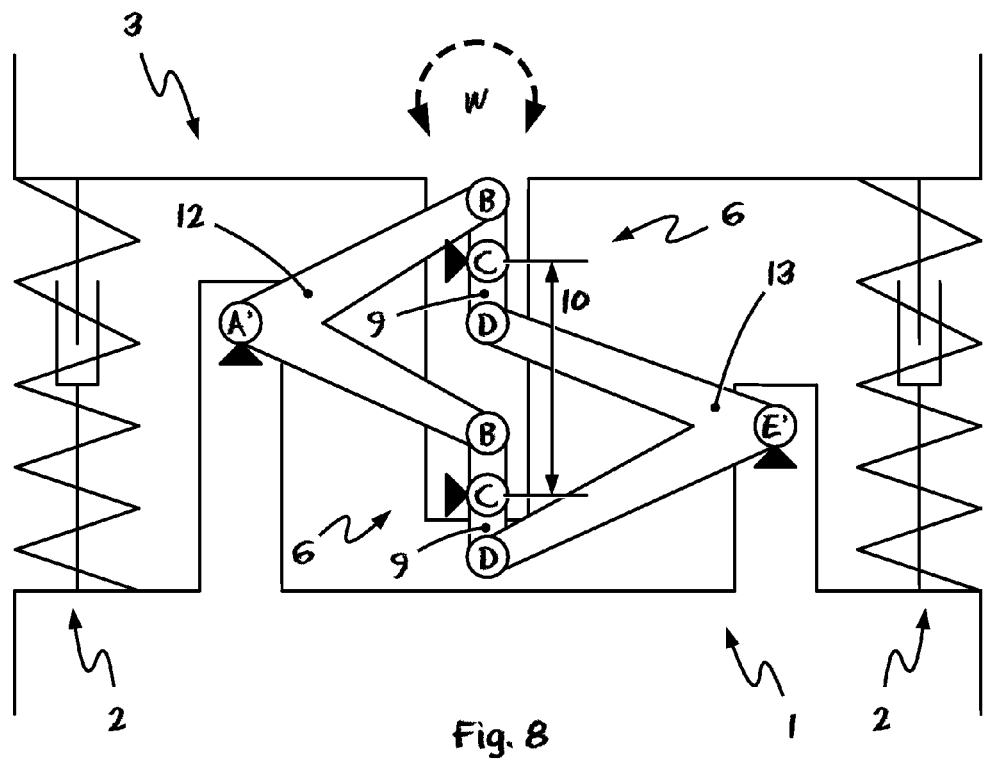
FIG. 8 is a side view of a Watt's linkage arrangement according to a sixth embodiment of the present invention, the view being similar to the view of FIGS. 2 through 6.

Finally, FIG. 8 shows another embodiment of a suspension device according to the present invention with a Watt's linkage arrangement 6. The Watt's linkage arrangement shown in FIG. 8 is based on essentially the Watt's linkage arrangement according to FIGS. 6 and 7. However, the embodiment according to FIG. 8 differs from the embodiment according to FIGS. 6 and 7 in that the lateral thrust struts 7, 8 of the two Watt's linkages, which were still articulated to a common pivot axis at A' and at E' before according to FIGS. 6 and 7 but were separate, are now designed as a one-piece strut in the form of a combination strut 12, 13 each in the Watt's linkage arrangement according to FIG. 8.

This embodiment, in which the lateral thrust struts, which are articulated together, thus form a component each resembling a steering triangle 12, 13, brings with it decisive further design simplifications as well as additional advantages because, first, the number of necessary components is thus reduced further considerably. In particular, four outer drag bearings are no longer needed now for four lateral thrust struts, but only two bearings are needed to connect the outer articulation points A', E' of the two combination struts 12, 13. Furthermore, the two Watt's linkages 6 thus united can be arranged essentially in one and the same plane, which leads to a considerable further reduction of the amount of space needed for installation. Finally, the tensile and compressive forces prevailing within the Watt's linkage arrangement will also partially cancel out each other without these forces having to enter the chassis or the cab in a roundabout way via the connection.

The warpings that are possible as a function of the spring stroke and kinematically determined elastic deformations of the one-piece combination struts 12, 13 thus formed can, moreover, be used by the design in this embodiment to make available variable spring rates of the elastic suspension between the cab 3 and the chassis 1, which spring rates depend on the spring stroke.

It thus becomes clear as a result that the present invention makes available a suspension device for the elastic suspension of a weight body, for example, a truck cab, with which the desired degree of freedom of motion, especially that of the vertical motion of the weight body or of the cab can be set in a space-saving manner and with a robust design, and undesired motions along other directions in space are effectively absorbed and suppressed at the same time. Thus, the present invention makes possible a low-maintenance and inexpensive spring-loaded suspension especially for cabs and the like.

Thus, the present invention makes an important contribution to the improvement of safety and reliability especially in the area of truck technology, especially in the case in which economic considerations and cost reduction are in the foreground in the design of cabs while the quality requirements are increased at the same time.

While specific embodiments of the invention have been shown and described in detail to illustrate the application of the principles of the invention, it will be understood that the invention may be embodied otherwise without departing from such principles.

APPENDIX

List of Reference Numbers

1 Substructure, chassis
2 Spring/absorber device
3 Weight body, cab
4 Direction of travel
5 Longitudinal arm
6 Watt's linkage
7, 8 Lateral thrust struts
9 Watt's linkage arm
A through E Joints, articulation points
A', E' Pivot axes
W Rolling motion, rolling torque
10 Distance, lever arm
11 Distance
12, 13 Combination strut, steering triangle

What is claimed is:

1. A suspension device for the spring-loaded suspension of a weight body of a vehicle body relative to a substructure of a vehicle chassis, the suspension device comprising:
an absorber device arranged between the weight body and the substructure for absorbing shocks and vibrations;
a Watt's linkage arrangement connecting the weight body and the substructure such that the weight body and the substructure are able to perform a limited relative motion, for reducing the degrees of freedom of motion of the weight body in relation to the substructure, said Watt's linkage arrangement including at least two Watt's linkages, wherein the directions of straight-line motion of said at least two Watt's linkages agree to provide a common direction of straight-line motion, wherein said Watt's linkages are arranged at spaced locations from one another along said common direction of straight-line motion, and wherein the planes of motion of said at least two Watt's linkages extend in parallel to one another, a distance between fulcrum points of two Watt's linkage arms of said two Watt's linkages being greater than a distance between lateral thrust struts of associated outer articulation points of said two Watt's linkages, the outer articulation points associated with said lateral thrust struts of said two Watt's linkages being located in pairs each on a pivot axis that is common to said two Watt's linkages.

2. A suspension device in accordance with claim 1, wherein joints of said at least two Watt's linkages are essentially in a plane of motion that is common to said at least two said Watt's linkages.

3. A suspension device in accordance with claim 1, wherein said lateral thrust struts of said two Watt's linkages, which said lateral thrust struts are articulated to said common pivot axis, are made in one piece in pairs each in the form of a combination strut.

4. A suspension device in accordance with claim 3, wherein said common pivot axes of said lateral thrust strut pairs that are articulated together or are one-piece lateral thrust strut pairs are elastically connected to said weight body and said substructure.

5. A suspension device in accordance with claim 1, wherein at least one mounting point of the Watt's linkage arrangement comprises an elastomer bearing;
said vehicle substructure is a frame of a vehicle;
said vehicle weight body is a truck cab mounted on top of said frame of said vehicle.

6. A suspension device in accordance with claim 1, further comprising an arm arranged at right angles to planes of motion of one of said Watt's linkage arrangements.

7. A suspension device in accordance with claim 1, wherein the suspension device is designed as a modular system comprising bars and joints.

8. A suspension device in accordance with claim 1, wherein said Watt's linkages being arranged to block rotation of said vehicle weight body with respect to said vehicle substructure about a travel direction of a respective vehicle.

9. A suspension arrangement comprising:
a vehicle weight body;
a vehicle substructure;
an absorber device arranged between the weight body and the substructure for absorbing shocks and vibrations; and
a Watt's linkage arrangement connecting the weight body and the substructure such that the weight body and the substructure are able to perform a limited relative motion, for reducing the degrees of freedom of motion of the weight body in relation to the substructure, said Watt's linkage arrangement including at least two Watt's linkages, wherein directions of straight-line motion of said at least two Watt's linkages agree to provide a common direction of straight-line motion, wherein said Watt's linkages are arranged at spaced locations from one another along said common direction of straight-line motion, and wherein the planes of motion of said at least two Watt's linkages extend in parallel to one another, said two Watt's linkages including thrust struts with outer articulation points, the outer articulation points being located in pairs each on a pivot axis that is common to said two Watt's linkages.

10. A suspension arrangement in accordance with claim 9, wherein joints of said at least two Watt's linkages are essentially in a plane of motion that is common to said at least two said Watt's linkages.

11. A suspension arrangement in accordance with claim 9, wherein said thrust struts which are articulated to a said common pivot axis, are made in one piece in pairs each in the form of a combination strut.

12. A suspension arrangement comprising:
a vehicle weight body;
a vehicle substructure;
an absorber device arranged between said vehicle weight body and said vehicle substructure for absorbing shocks and vibrations;
a first Watt's linkage having a fulcrum point pivotally connected to one of said vehicle weight body and said vehicle substructure, said first Watt's linkage having thrust struts pivotally connected to the other of said vehicle weight body and said vehicle substructure;

a second Watt's linkage having a fulcrum point pivotally to one of said vehicle weight body and said vehicle substructure, said second Watt's linkage having thrust struts pivotally connected to the other of said vehicle weight body and said vehicle substructure;

said first and second Watt's linkage being arranged to be in a common plane, said first and second Watt's linkage being arranged to provide a common direction of straight line motion, said first and second Watt's linkage being arranged to block relative rotation between said vehicle weight body and said vehicle substructure about an axis perpendicular to said common plane, each of said first and second Watt's linkages having a first thrust strut and a second thrust strut, ends of said first thrust struts of said first and second Watt's linkages being connected to a first common point, ends of said second thrust struts of said first and second Watt's linkages being connected to a second common point.

13. An arrangement in accordance with claim 12, wherein:
said vehicle substructure is a frame of a vehicle;
said vehicle weight body is a truck cab mounted on top of said frame of said vehicle.

14. An arrangement in accordance with claim 12, wherein:
said fulcrum points of said first and second Watt's linkage are connected to each other through said one of said vehicle weight body and said vehicle substructure.

15. An arrangement in accordance with claim 12, wherein:
said first and second Watt's linkage are arranged along said common direction of straight line motion.

16. An arrangement in accordance with claim 12, wherein:
said fulcrum points of said first and second Watt's linkages are arranged along said common direction of straight-line motion.

* * * * *